United States Patent
Garner et al.

(10) Patent No.: US 12,370,614 B2
(45) Date of Patent: Jul. 29, 2025

(54) FLOW BLOCK SEALING METHODS

(71) Applicant: Rolls-Royce Corporation, Indianapolis, IN (US)

(72) Inventors: Rusty M. Garner, Indianapolis, IN (US); Damon Ward, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 512 days.

(21) Appl. No.: 17/661,458

(22) Filed: Apr. 29, 2022

(65) Prior Publication Data

US 2023/0347433 A1 Nov. 2, 2023

(51) Int. Cl.
*B23H 7/30* (2006.01)
*B23H 7/18* (2006.01)

(52) U.S. Cl.
CPC ............... *B23H 7/30* (2013.01); *B23H 7/18* (2013.01); *B23H 2300/10* (2013.01)

(58) Field of Classification Search
None
See application file for complete search history.

(56) References Cited

U.S. PATENT DOCUMENTS

| | | | | |
|---|---|---|---|---|
| 3,399,125 A | * | 8/1968 | Mikoshiba | B23H 3/10 205/672 |
| 3,616,433 A | * | 10/1971 | Williams | B23H 3/00 204/225 |
| 6,743,349 B2 | | 6/2004 | Mori et al. | |
| 7,318,884 B2 | | 1/2008 | Mielke | |
| 2004/0140224 A1 | | 7/2004 | Steele et al. | |
| 2005/0098455 A1 | | 5/2005 | Hsiao et al. | |

* cited by examiner

*Primary Examiner* — Louis J Rufo
(74) *Attorney, Agent, or Firm* — Shumaker & Sieffert, P.A.

(57) ABSTRACT

A pulsed electrochemical machining (pECM) system including a tool body defining a tool axis and a proximal end and a distal end. The tool body includes one or more electrodes, each of the one or more electrodes defining a working surface at the distal end of the tool axis configured to face a workpiece. Electrolyte at least partially fills an interelectrode gap defined by the working surface at the distal end of the tool axis and a target surface of the workpiece. A first flow block coupled to the tool body and a second flow block coupled to the workpiece are configured to form at least one seal surrounding at least a portion of a perimeter of the interelectrode gap, and the at least one seal is configured to reduce or eliminate flow of the electrolyte out of the portion of the perimeter of the interelectrode gap.

16 Claims, 7 Drawing Sheets

FLOW BLOCK SEALING METHODS

TECHNICAL FIELD

The disclosure relates to pulsed electrochemical machining (pECM).

BACKGROUND

Machining processes may involve removal of material from a workpiece to form a component having a finished shape and texture. Pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 50 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional methods. Materials commonly machined with pECM include, for example, nickel, iron, and titanium-based alloys in a variety of formats such as cast (including single crystal), forged, additively manufactured, and powdered metallurgy.

SUMMARY

In some examples, the disclosure describes a pulsed electrochemical machining (pECM) system that includes a tool body defining a tool axis and a proximal end and a distal end, the tool body comprising one or more electrodes, and each of the one or more electrodes includes an electrically conductive material and defines a working surface at the distal end of the tool axis configured to face a workpiece. An interelectrode gap is defined by the working surface at the distal end of the tool axis and a target surface of the workpiece, and an electrolyte configured to be charged by the one or more electrodes may at least partially fill the interelectrode gap. The pECM system includes a first flow block coupled to the tool body and a second flow block coupled to the workpiece, and the first flow block and second flow block are configured to form at least one seal surrounding at least a portion of a perimeter of the interelectrode gap. The at least one seal is configured to reduce or eliminate flow of the electrolyte out of the portion of the perimeter of the interelectrode gap.

In some examples, the disclosure describes a pulsed electrochemical machining (pECM) method that includes positioning a working surface of one or more electrodes relative to a target surface of a workpiece to remove material from the target surface of the workpiece. The method includes forming a seal surrounding at least a portion of a perimeter of an interelectrode gap, and the at least one seal is configured to reduce or eliminate flow of an electrolyte out of the portion of the perimeter of the interelectrode gap. The at least one seal is formed by a first flow block coupled to a tool body and a second flow block coupled to the workpiece. The method includes delivering the electrolyte into the interelectrode gap between the working surface of the one or more electrodes and a target surface of the workpiece and generating a pulsed direct current between one or more electrodes of a machining tool and the workpiece. The machining tool includes the tool body, which defines a tool axis and includes one or more electrodes. Each of the one or more electrodes includes an electrically conductive material and defines the working surface at a distal end of the tool axis configured to face the workpiece.

The details of one or more examples are set forth in the accompanying drawings and the description below. Other features, objects, and advantages will be apparent from the description and drawings, and from the claims.

DETAILED DESCRIPTION

Figure 1A:
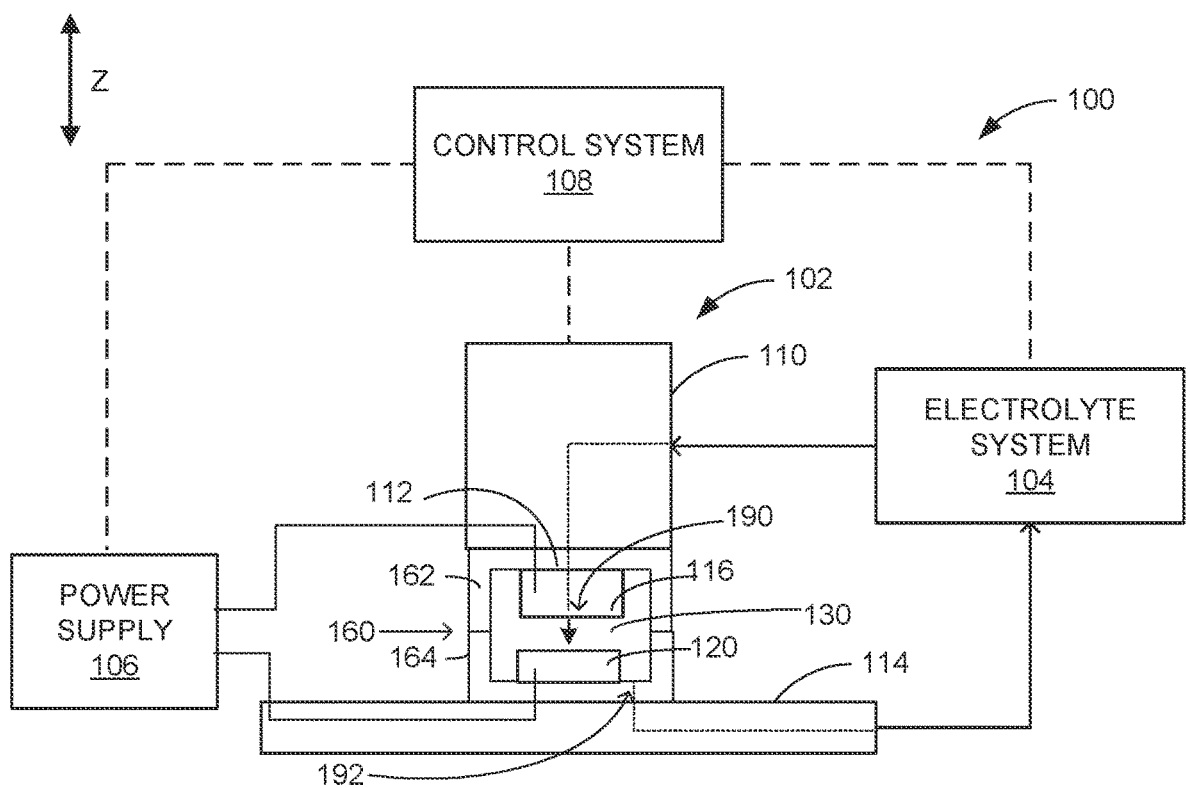
FIG. 1A is a conceptual block diagram illustrating a pulsed electrochemical machining (pECM) system.

The disclosure generally describes techniques and systems for forming a seal around an interelectrode gap for electrolyte used during pulsed electrochemical machining. During pECM machining, electrolyte distribution across the anodic workpiece may be important to ensure consistent machining across the workpiece. Exposure to the electrolyte solution may be limited to areas of the anodic workpiece that are to be machined, while areas of the workpiece that are not to be machined may be protected from exposure.

According to some examples of the disclosure, pECM systems may be configured with flow blocks that form effective seals to seal an electrolyte within an interelectrode gap around the anodic workpiece are disclosed. Example assemblies including a first flow block and a second flow block that combine to form such a seal may reduce variation across the target surface for machining of the workpiece by allowing pressure to be maintained within the interelectrode gap. Elevating the pressure of an electrolyte in the interelectrode gap in the pECM system may be desirable to reduce or eliminate voids in the electrolyte. Voids in the electrolyte may not perform electrochemical machining, and therefore may have deleterious effects (e.g., reduced consistency of the finished part, reduced efficiency of the process) when present in the system. Furthermore, sealing techniques and assemblies according to the present disclosure may limit expansion of hydrogen gas generated in the system. Similar to voids in the electrolyte, hydrogen gas created by the electrochemical process may form bubbles which have deleterious effects when present in the electrolyte. Furthermore, elevating the pressure of an electrolyte in the interelectrode gap may allow for more efficient evacuation of anodically dissolved metal particles from the workpiece out of the interelectrode gap. In some examples, carefully controlling the dimensions of the interelectrode gap may allow for easier control over the flow direction of the electrolyte, and sealing techniques and assemblies described herein may assist in achieving the electrolyte flow control necessary to minimize and/or eliminate voids or bubbles in the electrolyte.

In some aspects of the current disclosure, first and second flow blocks may be mechanically coupled together to form an effective seal around an interelectrode gap defined by a machining tool, which may be the cathode of an electrolytic cell, and the workpiece, which may be the anode of the electrolytic cell. In some examples, the first and second flow blocks may form a clamshell surrounding at least a portion of the perimeter of the interelectrode gap. In some examples, first and second flow blocks may allow for machining on opposite surfaces of a workpiece using a single set of first and second flow blocks. Optionally, the first and second flow blocks may be separated by one or more gaskets at the interface between the opposing flow blocks to form the seal. The opposing flow blocks may be coupled together by one or more bolts or other fasteners, which may be tightened to pressurize at least one gasket and form an effective fluidic seal, providing a fluid cavity to contain electrolyte within the interelectrode gap and slowing or preventing electrolyte from flowing from the interelectrode gap, through the gasket, and into the surrounding environment.

In some examples, the workpiece may be a component (e.g., an airfoil, an airfoil coversheet, airfoil spar, or the like). In some examples, a complex shape may be desired for the final workpiece (e.g., defining a curvilinear segment or combination of segments). Since the workpiece may take on a complementary shape of the machining tool, the machining tool body may accordingly define a perimeter with complex shape. It may be difficult to form an effective fluidic seal in the interelectrode gap around the perimeter of a complex shape. In some examples, pECM assemblies according to present disclosure may include a cathode seal body configured to surround a portion of the perimeter of the machining tool body (e.g., completely surround the perimeter of the tool body. The cathode seal body may define an outer perimeter with a simple shape (e.g., a circle, oval, ellipse, rectangle, or other geometrical shape). Accordingly, in some examples, the shape of the outer perimeter defined by the machining tool body may be different than the shape of the outer perimeter defined by the cathode seal body. The cathode seal body may assist in sealing the machining tool body from the surrounding environment, e.g., because the outer perimeter of the cathode seal body with a simple shape may be easier to seal than the outer perimeter of the machining tool body with a complex shape. In some examples, the cathode seal body may be additively manufactured in a single piece (e.g., integrally formed) and configured to slide over a proximal or distal end of the tool body.

The workpiece may define one or more apertures or depressions. If electrolyte is allowed to penetrate the one or more apertures, the electrolyte may perform electrochemical work and dissolve metal from the workpiece, undesirably changing the dimensions of the one or more apertures. In some aspects of the present disclosure, a seal assembly may include one or more seal bars coupled to at least one of the flow blocks, and the seal bar may include at least one adjustable seal pad configured to adjustably extend from a recess within the seal bar. In some examples, the adjustable seal pad may extend from the seal bar into an aperture or depression defined by the workpiece, sealing the aperture and preventing electrolyte from penetrating the aperture and dissolving metal. Thus, the shape and dimensions of the aperture or depression may be maintained throughout the pECM process.

FIG. 1A is a schematic conceptual block diagram illustrating an example pulsed electrochemical machining (pECM) system 100 for machining a workpiece 120. pECM system 100 includes a mechanical system 102, an electrolyte system 104, a power supply 106, and a control system 108. While illustrated as separate components, the various components of pECM system 100 may be integrated with other components (e.g., power supply 106 incorporated into mechanical system 102) or overlap with other components (e.g., controllers of mechanical system 102 overlapping with control system 108). While examples of the disclosure are described primarily with regard to pulsed electrochemical machining processes performed by pECM system 100, other examples of the disclosure may be employed using other machining techniques that employ electrochemical machining to shape or otherwise selectively remove material from a workpiece.

Mechanical system 102 may include an actuation system 110, a machining tool 112, an enclosure system 114, and a sealing assembly 160 including first flow block 162 coupled to the machining tool 112 and a second flow block 164 coupled to a workpiece 120. Actuation system 110 may be configured to control a position of machining tool 112 relative to workpiece 120. During a pECM process, actuation system 110 may adjust the position of tool 112 relative to workpiece 120 as needed by moving tool 112, workpiece 120, or both. Actuation system 110 may include one or more actuators, such as direct drive actuators, configured to move tool 112 and/or workpiece 120 as desired during a pECM process. For examples, one or more actuators may be configured to feed or otherwise move machining tool 112 toward workpiece 120 during a pECM process. In some examples, actuation system 110 may be configured to oscillate machining tool 112 (e.g., along the z-axis). As discussed herein, upward in the z-direction is defined as a proximal direction, and downward in the z-direction is defined as a distal direction. Such movement of tool 112 by actuation system may improve removal of dissolved material and restore a concentration of electrolyte between machining tool 112 and workpiece 120. As illustrated in the example of FIG. 1A, mechanical system 102 may be configured to receive electrolyte from electrolyte system 104 and discharge the electrolyte to or proximate to machining tool 112.

Machining tool 112 may be configured to mechanically couple to actuation system 110 and electrically couple to power supply 106. For example, machining tool 112 may include one or more structures or assemblies to couple to actuation system 110, such that machining tool 112 receives a control force for positioning machining tool 112, electrolyte (if distributed via mechanical system 102) for discharging from machining tool 112, and electrical current for generating an electric potential between machining tool 112 and workpiece 120. As will be described further in FIGS. 1B and 1C below, machining tool 112 may be configured to define a working surface that, in combination with workpiece 120 and the electrolyte supplied by electrolyte system 104, forms an electrolytic cell that dissolves material from the outer surface of workpiece 120 using electrolysis.

Enclosure system 114 may be configured to mount workpiece 120 and electrically couple workpiece 120 to power supply 106 for generating a voltage between machining tool 112 and workpiece 120 (e.g., in the form of a pulsed direct current). For example, enclosure system 114 may position workpiece 120 toward machining tool 112, such that a working surface of workpiece 120 is exposed to a working surface of machining tool 112. In some examples, enclosure system 114 may capture spent electrolyte from workpiece 120 for return to electrolyte system 104.

Electrolyte system 104 may be configured to condition and circulate electrolyte (e.g., liquid electrolyte) for distribution to a working surface of machining tool 112, such as via mechanical system 102. Electrolyte system 104 may include one or more pumps configured to discharge the electrolyte to mechanical system 102, one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte.

Pulsed electrochemical machining system 100 includes seal assembly 160, which includes first flow block 162 and second flow block 164. First flow block 162 is coupled to tool body 116 of machining tool 112, and second flow block 164 is coupled to workpiece 120. First flow block 162 and second flow block 164, in combination, are configured to form one or more seals surrounding at least a portion of a perimeter of interelectrode gap 130, which is configured to reduce or eliminate flow of the electrolyte out of the portion of the perimeter of interelectrode gap 130. The one or more seals formed by first flow block 162 and second flow block 164 may be relatively fluid tight to form a sealed fluid cavity between the blocks that prevents electrolyte from leaking out of interelectrode gap 130 during the pECM process. In some examples, the one or more seals formed by first flow block 162 and second flow block 164 may be formed by mechanically coupling first flow block 162 to second flow block 164. The seal formed by first flow block 162 and second flow block 164 may maintain electrolyte in interelectrode gap 130 at operating pressures of the pECM process.

As discussed above, machining tool 112 may be configured to move relative to workpiece 120. In some examples, first flow block 162 and second flow block 164 may be stationary, such that machining tool 112 moves through first flow block 162 towards workpiece 120. In some examples, a stationary seal assembly 160 may form an effective seal surrounding interelectrode gap 130, creating a fluid tight cavity that withstands operating pressures of the pECM process, maintaining electrolyte pressure in the cavity and preventing electrolyte from leaking out of interelectrode gap 130.

In some examples, first flow block 162 and second flow block 164 may be mechanically coupled together to completely surround the perimeter of interelectrode gap 130. In some examples, first flow block 162 and second flow block 164 may completely surround interelectrode gap 130 except for an inlet or inlets 190 and outlet or outlets 192 for electrolyte pumped into interelectrode gap 130.

Second flow block 164 is coupled to the workpiece and configured to form a seal with first flow block 162. In some examples, as illustrated in FIG. 1A, second flow block 164 is a separate component from containment system 114. In some examples, second flow block 164 and containment system 114 may be formed integrally. In some examples, outlet or outlet 192 may pass through second flow block 164 to recirculate electrolyte through electrolyte system 104. In some examples, electrolyte may pass through first flow block 162 to inlet or inlets 190. In some examples, electrolyte may be pumped by electrolyte system 104 through machining tool 112 to inlet or inlets 190. Additionally, or alternatively, inlets 190 may be formed through second flow block 164 and outlets 192 may be formed through first flow block 162 to supply electrolyte to interelectrode gap 130.

Power supply 106 may be configured to generate an electric potential between at least one electrode defined by machining tool 112 and workpiece 120. For example, power supply 106 may be configured to apply a voltage between machining tool 112 and workpiece 120 to generate current flow between machining tool 112 and workpiece 120 with the electrolyte flowing or otherwise present between machining tool 112 and workpiece 120. For a pulsed ECM process, power supply 106 may be configured to supply voltage in pulses, such as in combination with oscillations of machining tool 112 relative workpiece 120, which may improve efficiency of the process. For example, power supply 106 may include a direct current (DC) source that applies a pulsed direct current to both machining tool 112 and workpiece 120 during the pulse electrochemical machining process. In some examples, actuation system 110 may oscillate the position of machining tool 112 relative workpiece 120 in coordination with the pulsed direct current. In some examples, as described above, first flow block 162 and second flow block 164 may remain stationary during oscillations of machining tool 112. Alternatively, seal assembly 160 may be configured to allow first flow block 162, second flow block 164, or both to oscillate with machining tool 112 during pECM operations.

Control system 108 may be communicatively coupled to mechanical system 102, electrolyte system 104, and power supply 106, and configured to send control signals to mechanical system 102, electrolyte system 104, and power supply 106. For example, the control signals may cause mechanical system 102 to control (e.g., dynamically) a position of machining tool 112 relative to workpiece 120, cause electrolyte system 104 to supply electrolyte the interelectrode gap 130 between machining tool 112 and workpiece 120, and cause power supply 106 to generate an electric potential between machining tool 112 and workpiece 120. Further operation of control system 108 will be described in FIG. 1D below.

Figure 1B:
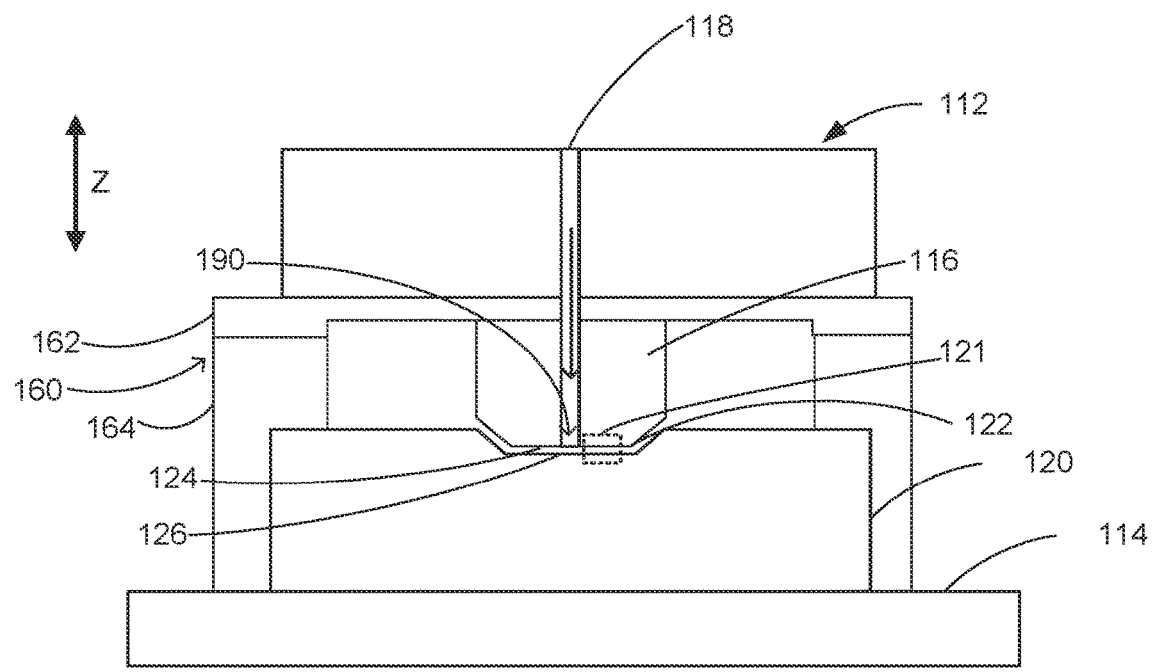
FIG. 1B is a side view cross-sectional conceptual diagram illustrating operation of a pECM tool of the pECM system of FIG. 1A.

Machining tool 112 defines a working surface that forms workpiece 120 into a component having a particular shape or set of dimensions (e.g., approximately the complimentary shape of machining tool 112). FIG. 1B is a side view cross-sectional conceptual diagram illustrating operation of machining tool 112 of pECM system 100 of FIG. 1A. Machining tool 112 includes a tool body 116 defining a tool axis that aligns with an axis of actuation system 110 of FIG. 1A (Z direction as illustrated in FIG. 1B). Tool body 116 includes one or more electrodes 122 (one or more cathodes). While illustrated in FIG. 1B as including a single electrode 122, tool body 116 may include multiple electrodes 122. Each electrode 122 defines a working surface 124 at a distal end of the tool axis. In most cases, electrode 122 is a cathode. However, in some instances, electrode 122 may be used as an anode (e.g., periodically), with workpiece 120 being the cathode. When machining tool 112 is attached to actuation system 110, each working surface 124 is configured to face a corresponding target surface 126 of workpiece 120. In some examples, as illustrated, corresponding target surface 126 is located at a proximal end of workpiece 120. In some examples, such as illustrated in FIG. 1B, tool body 116 may include an electrolyte channel 118 configured to receive an electrolyte from electrolyte system 104 (e.g., via mechanical system 102) and discharge the electrolyte into the interelectrode gap (130, FIG. 1C) through one or more inlets 190 near working surface 124 of electrode 122. Additionally, or alternatively, electrolyte system 104 may be configured to introduce electrolyte into interelectrode gap 130 through workpiece 120, or through an inlet or inlets at a perimeter of interelectrode gap 130. In other words, although inlet or inlets 190 as shown illustrate the electrolyte flowing from tool body 116 into interelectrode gap 130, the electrolyte could flow from the anode, which in most cases is the workpiece, into the cathode. Additionally, or alternatively, in some examples, the electrolyte flow could be introduced to flow across interelectrode gap 130 (e.g. electrolyte originating out of the left hand side of FIG. 1B and exiting out the right hand side).

Each electrode 122 includes an electrically conductive material at working surface 124. Likewise, workpiece 120 may be an electrically conductive material. When an electric potential (e.g., in the form of a pulse direct current) is generated between working surface 124 of electrode 122 and target surface 126 of workpiece 120 (e.g., with power supply under the control of control system 108), working surface 124 may form a cathode surface and target surface 126 may form an anode surface. As working surface 124 is advanced and material from workpiece 120 is removed, a shape of target surface 126 may generally correspond to the complimentary shape of working surface 124. While the shape of workpiece 120 is shown to mirror the shape of electrode 122 in FIG. 1B, in other examples, the dimensions and shape formed in workpiece 120 from the removal of material from workpiece 120 do not exactly mirror the shape of the tool 112.

The conductive materials of electrode(s) 122 and workpiece 120 may be any suitable conductive material such as metal, metal alloy, or ceramic material. Examples of metals that may be used to form the workpiece 120 and the electrode(s) 122 of tool 112 include nickel, iron, and titanium-based alloys in a variety of formats such as cast (including single crystal), forged, additively manufactured, and powdered metallurgy. Examples of suitable metals and metal alloys for the workpiece 120 and electrode(s) 122 of tool 112 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, Al 6061, Al 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

In some examples, workpiece 120 is a nickel superalloy such as CMSX-4. The nickel superalloy may have a composition including Chromium (e.g., about 5.5 weight (wt %) to about 7.5 wt %), Cobalt (e.g., about 9 wt % to about 11 wt %), Molybdenum (e.g., about 0.3 wt % to about 0.9 wt %), Tungsten (e.g., about 5 wt % to about 7 wt %), e.g., with the balance being nickel. In some examples, such a nickel superalloy may also include Titanium (e.g., about 0.5 wt % to about 1.5 wt %), Titanium (e.g., about 0.5 wt % to about 1.5 wt %), Hafnium (e.g., about 0 wt % to about 0.2 wt %), Tantalum (e.g., about 5.5 wt % to about 6.5 wt %), Tantalum (e.g., about 5.5 wt % to about 6.5 wt %), Rhenium (e.g., about 2 wt % to about 4 wt %), and/or Rhenium (e.g., about 2 wt % to about 4 wt %) in trace amounts.

Figure 1C:
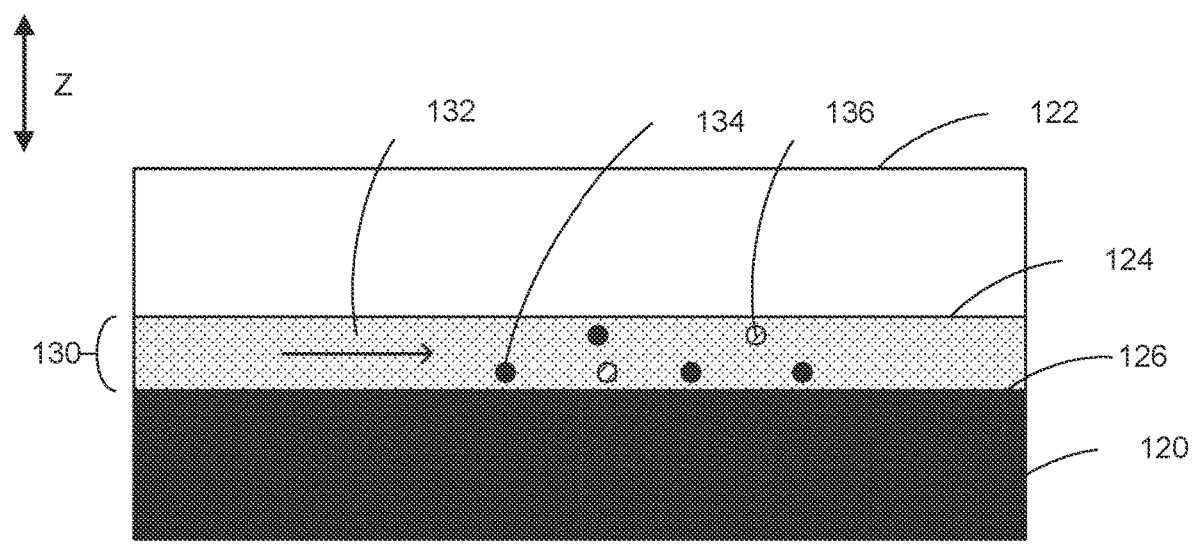
FIG. 1C is a side view cross-sectional conceptual diagram illustrating a magnified view of a portion of FIG. 1B.

FIG. 1C is a side view cross-sectional conceptual diagram showing a magnified view within window 121 indicated in FIG. 1B to illustrate operating principles of the pECM tool of FIG. 1B. Working surface 124 of electrode 122 is positioned relative to target surface 126 of workpiece 120 to form an interelectrode gap 130, and an electrolyte 132 flows through interelectrode gap 130. When an electric potential (e.g., in the form of a pulse direct current) is generated between working surface 124 and target surface 126, current flows from working surface 124 to target surface 126 via electrolyte 132 to form an electrolytic cell. The current dissolves material at target surface 126 to generate electrochemical reaction products that include dissolved material 134, hydrogen gas 136, and heat. Electrolyte 132 carries away the electrochemical reaction products from interelectrode gap 130. In general, material removal rate may be related to current density in interelectrode gap 130. The current density in interelectrode gap 130 may be related to a variety of parameters including, but not limited to: spatial parameters, such as a distance of interelectrode gap 130; electrical parameters, such as an electric potential across interelectrode gap 130; electrolyte parameters, such as a flow rate of electrolyte 132; and other parameters that may affect flow of current from working surface 124 to target surface 126. First flow block 162 and second flow block 164, which are configured to form a seal around at least a portion of the perimeter of interelectrode gap 130 may assist in maintaining the desired material removal rate by allowing electrolyte pressure to be maintained in interelectrode gap 130, which may be desirable to reduce the size of bubbles formed by hydrogen gas 136 in electrolyte 132.

Figure 1D:
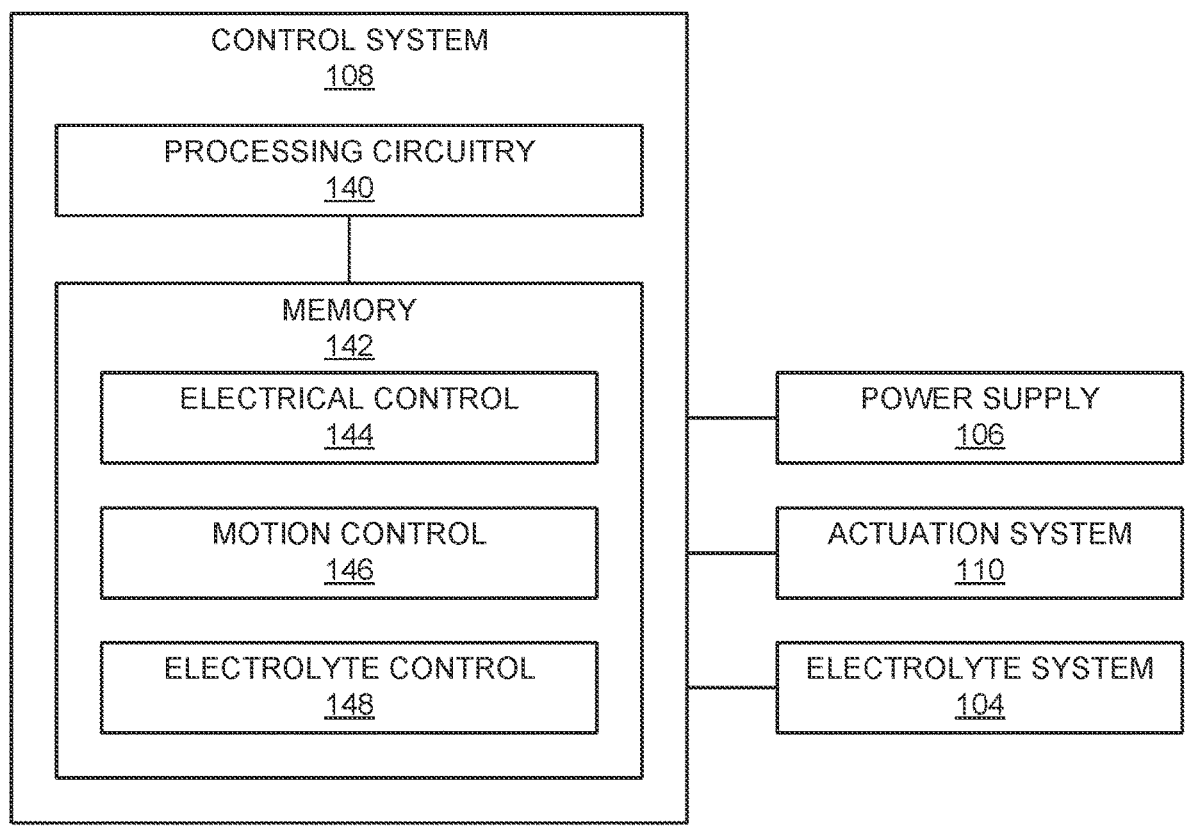
FIG. 1D is a conceptual block diagram illustrating an example control system of the pECM system of FIG. 1A.

FIG. 1D is a conceptual block diagram illustrating an example control system 108 of pECM system 100 of FIG. 1A. Control system 108 includes processing circuitry 140 and a memory 142. Memory 142 includes computer-readable instructions that, when executed by processing circuitry 140, causes processing circuitry 140 to perform various functions related to control of components of pECM system 100. Processing circuitry 140 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 140 herein may be embodied as software, firmware, hardware or any combination thereof. Memory 142 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 142 may store any suitable information, including information for executing one or more electrochemical machining processes with which pECM system 100 performs on workpiece 120. For example, memory 142 may store one or more of electrical control instructions 144, motion control instructions 146, and electrolyte control instruction 148 in separate memories within memory 142 or separate areas within memory 142. Electrical control 144, motion control 146, and electrolyte control 148 may, in combination, define parameters that control pECM system 100 to remove material from workpiece 120 to generate a component having particular dimensions. In some examples, workpiece 120 may be a partially fabricated component having relatively rough dimensions, such that the pECM process may further refine workpiece 120 to relatively fine dimensions.

Electrical control 144 may define values for electrical parameters of a pECM process including, but not limited to, voltage amplitude applied to electrode 122 and workpiece 120, frequency of electric current, duty cycle (e.g., pulse length), current amplitude, and other electric parameters associated with control of current across interelectrode gap 130. Processing circuitry 140 may generate and send control signals that include the electrical parameters to electrical control circuitry of power supply 106.

Motion control 146 may define values for motion parameters of a pECM process including, but not limited to, feed rate of machining tool 112, position of machining tool 112 (e.g., depth limit of machining tool 112), frequency of oscillation of machining tool 112, amplitude of oscillation of machining tool 112, length of interelectrode gap 130, and other motion parameters associated with control of relative and/or time-varying position of working surface 124. Processing circuitry 140 may generate and send control signals that include the motion parameters to actuation circuitry of actuation system 110.

Electrolyte control 148 may define values for electrolyte parameters of a pECM process including, but not limited to, flow rate of electrolyte 132 through interelectrode gap 130, temperature of electrolyte 132, and other electrolyte parameters associated with conditions of electrolyte 132 in interelectrode gap 130. Processing circuitry 140 may generate and send control signals that include the electrolyte parameters to electrolyte control circuitry of electrolyte system 104.

Figure 2A:
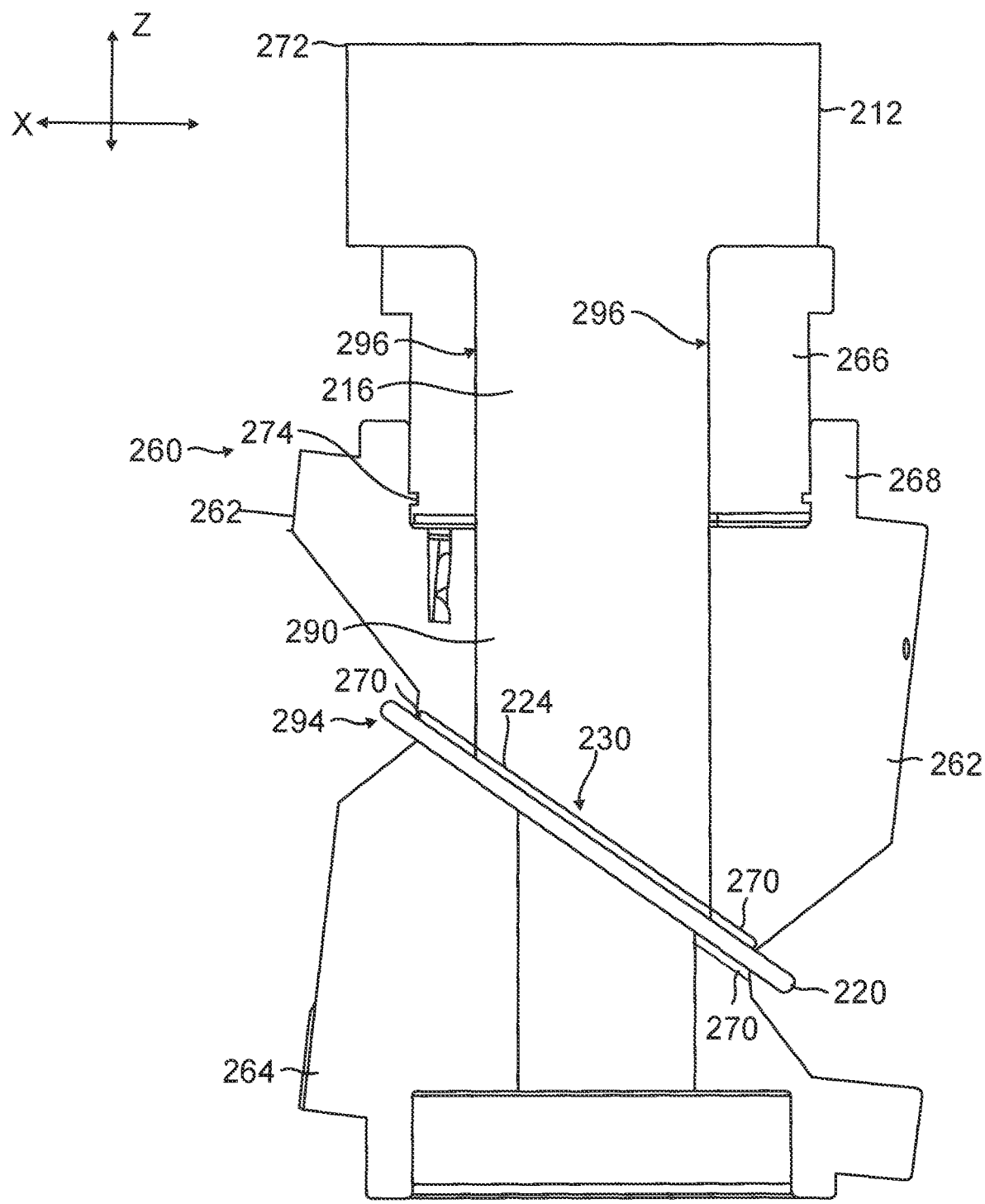
FIG. 2A is a side view cross-sectional diagram illustrating an example seal assembly for use with the example pECM system of FIG. 1A.
Figure 2B:
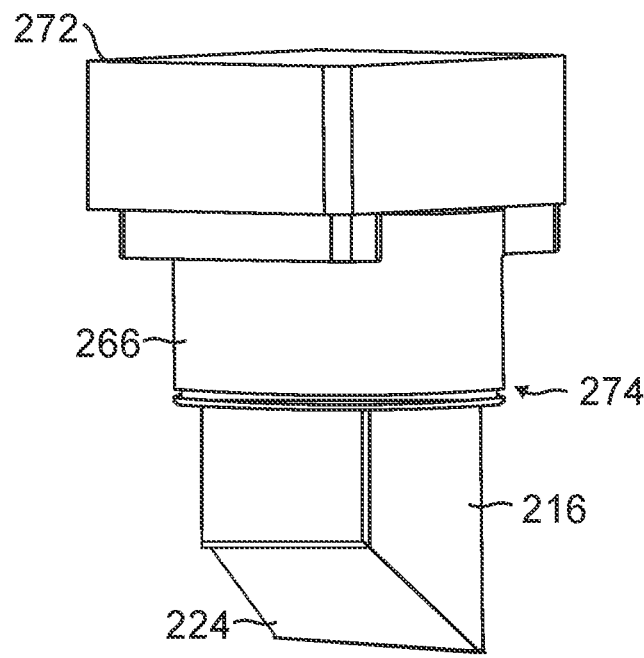
FIG. 2B is a conceptual perspective view illustrating a portion of the example seal assembly of FIG. 2A.
Figure 2C:
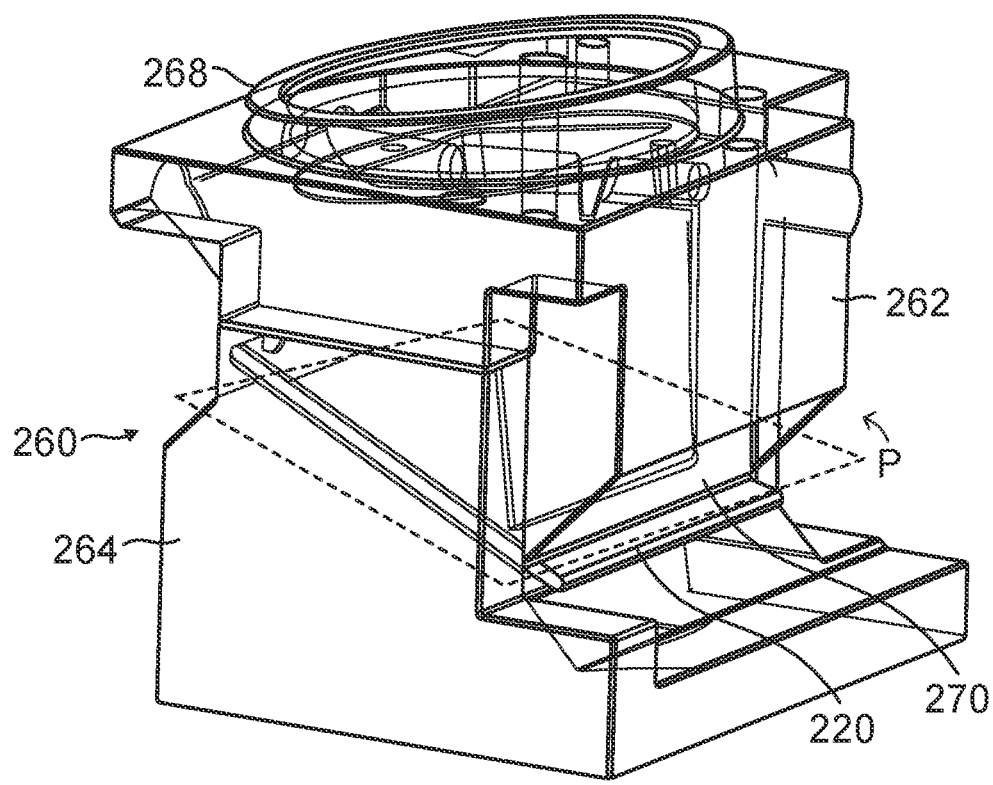
FIG. 2C is a conceptual perspective view illustrating a portion of the example seal assembly of FIG. 2A.

FIG. 2A-C illustrate an example seal assembly 260 for use in a pECM system, such as pECM system 100 of FIG. 1A. Seal assembly 260 may be an example of seal assembly 160 described above for system 100 of FIG. 1A. FIG. 2A is a side view cross-sectional diagram illustrating an example seal assembly 260, taken along a central vertical axis of tool body 216. In some examples, the central vertical axis of tool body 216 may align with an axis of actuation system 110 of FIG. 1A (e.g., aligned with the z-axis of FIG. 1A).

Seal assembly 260 of FIGS. 2A-2C is an example of seal assembly 160 of system 100 illustrated in FIGS. 1A-1D, and like features are similarly numbered (e.g., with interelectrode gap 230 being similar to that described for interelectrode gap 130, and so forth). Seal assembly 260 is configured to prevent, reduce, or eliminate flow of the electrolyte out of the portion of the perimeter of the interelectrode gap 230 and to provide a cavity for containing electrolyte at operating pressures of the pECM system. Seal assembly 260 includes first flow block 262 and second flow block 264 surrounding the perimeter of interelectrode gap 230. Interelectrode gap 230 is defined between the electrode(s) of tool body 216 and workpiece 220. Seal assembly 260 includes cathode seal body 266 seated in cathode seal collar 268 of first flow block 262. First flow block 262 is coupled to tool body 216 and second flow block 264 is coupled to workpiece 220. In some examples, seal assembly 260 may include additional fixturing or workholding components which are not illustrated for clarity.

First flow block 262 and second flow block 264 are mechanically coupled together to surround at least a portion of the perimeter (P, FIG. 2C) of interelectrode gap 230. In some examples, as illustrated, first flow block 262 and second flow block 264 are configured to oppose each other to form an effective fluidic seal, and are spaced apart from each other in the z direction. One of skill in the art will appreciate that other configurations are possible, such as first flow block 162 and second flow block 164 configured to oppose each other to form a seal and are spaced apart in a lateral (e.g., in the X-direction) or other direction.

While the example of FIG. 2A include only two flow blocks that combine to form seal 294 around interelectrode gap 230, in other examples, seal 294 may include more than two opposing flow blocks that are configured to be assembled to create a seal 294 around interelectrode gap 230. In some examples, first flow block 262 and second flow block 264 may be coupled together to completely surround the perimeter of interelectrode gap 230. In some examples, the opposing flow blocks may completely surround interelectrode gap 230 except for an inlet or inlets (190, FIGS. 1A-1C) and outlet or outlets (192, FIGS. 1A-1C) for electrolyte pumped into interelectrode gap 230. In some examples, opposing flow blocks 262 and 264 may be mechanically coupled together with one or more gaskets 270 disposed between the flow blocks, which may assist in forming an effective seal. In some examples, as illustrated, workpiece 220 may extend laterally (e.g., in the X-direction) beyond the interelectrode gap 230 defined by working surface 224 at the distal end of tool body 216 and be sealed by gaskets 270 on both proximal and distal surfaces of workpiece 220.

In some examples, gaskets 270 may include an electric insulator, a thermal insulator, or both, configured to insulate or isolate (e.g., electrically isolate) first flow block 262 from second flow block 264. In some examples, gaskets 270 may include a compressible solid material such as an elastomer, rubber, or the like useful for forming an effective liquid seal. In some examples, first flow block 262 and second flow block 264 may be coupled together by at least one bolt, screw, or other suitable fasteners (not pictured) which may be tightened or otherwise employed to fix first flow block 262 to second flow block 264, e.g., by applying pressure to the gasket disposed between first flow blocks 262 and second flow block 264.

First flow block 262 forms one surface of seal 294 surrounding the perimeter of interelectrode gap 230. In some examples, tool body 216 may be seated or otherwise extended through first flow block 262. Since this may provide an additional pathway for electrolyte to leak from gap 230, in some examples, first flow block 262 may include cathode seal collar 268, which may be positioned at a proximal end of first flow block 262. As positioned, cathode seal collar 268 may be configured to receive cathode seal body 266 and provide a fluidic seal between first flow block 262 and cathode seal body 266. In some examples, the sealing surface provided by cathode seal collar 268 is an inner diameter of a lip or protrusion extending in a proximal direction from first flow block 262.

Second flow block 264 forms another surface of seal 294 surrounding the perimeter of interelectrode gap 230, or may be coupled to and mechanically supports workpiece 220, which may form one of the surfaces of seal 294 with first flow block 262 as illustrated in FIG. 2A. Stated similarly, second flow block 264 may form seal 294 by contacting first flow block 262 directly, or by mechanically supporting one or more intervening gaskets 270 between first flow block 262 and second flow block 264, or by mechanically supporting both intervening workpiece 220 and intervening gaskets 270 to form seal 294. Workpiece 220 may be configured to form a part of the at least one seal 294 formed by first flow block 262 and the second flow block 264 by being disposed between first flow block 262 and second flow block 264. In some examples, as mentioned above, second flow block 264 may be part of an enclosure system (e.g., enclosure system 114 (FIG. 1A)) or may be a separate component added to a pECM system.

Tool body 216 may extend in the z-direction from proximal end 272 to working surface 224, which defines working surface 224 at the distal end of tool body 216. As illustrated, in some examples tool body 216 may pass through an aperture in first flow block 262.

Seal assembly 260 includes cathode seal body 266, which prevents electrolyte from flowing along sides 296 of tool body 216 adjacent to first flow block 262 and between tool body 216 and first flow block 262 into the surrounding environment, e.g., while tool body 216 moves or oscillates during pECM operations. In the illustrated example, cathode seal body 266 prevents electrolyte from flowing up sides 296 of tool body 216 in a proximal direction while the tool body is oscillating or otherwise moving. In some examples, cathode seal body 266 may be formed in one piece by an additive manufacturing process and fitted over tool body 216 by sliding cathode seal body 266 over a distal end of tool body 216. In some examples, cathode seal body 266 may be manufactured as part of tool body 216, such that cathode seal body 266 and tool body 216 are a uniform solid component (e.g., where both are machined together out of metal). In some examples, as discussed, additive manufacturing of cathode seal body 266 and/or tool body 216 may be an option, but other suitable metal working methods are often employed as well. In some examples, cathode seal body 266 may be configured to surround at least part the perimeter of tool body 216 and extend over a portion of tool body 216 between proximal end 272 and working surface 224. Cathode seal body 266 may include a groove 274 which is configured to receive an o-ring or other sealing member which assists in forming an effective seal between cathode seal body 266 and first flow block 262.

In some examples, since tool body 216 is designed to machine workpiece 220, and workpiece 220 may be desired to take on a complex shape the pECM machining to form a component, tool body 216 may, in some examples, define an outer perimeter with a complex shape. Since forming a seal around an outer perimeter with a complex shape may be difficult, in some examples cathode seal body 216 may be configured to surround the complex shape define by outer perimeter of tool body 216, and cathode seal body 266 may define an outer perimeter with a simple shape, which may be easier to seal. In some examples, cathode seal body 266 may be formed integrally in one piece through additive manufacturing, such that the inner perimeter of cathode seal body 266 mirrors the shape of the outer perimeter of tool body 216, and the outer perimeter of cathode seal body 266 defines a simple shape configured to form a seal with seal collar 268 of first flow block 262 (e.g., using an o-ring).

Figure 3A:
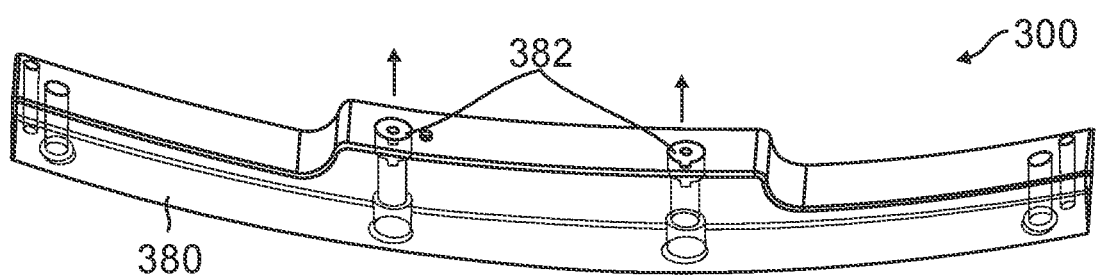
FIG. 3A is a conceptual perspective view illustrating an example seal bar for use with the example seal assembly of FIG. 1A.
Figure 3B:
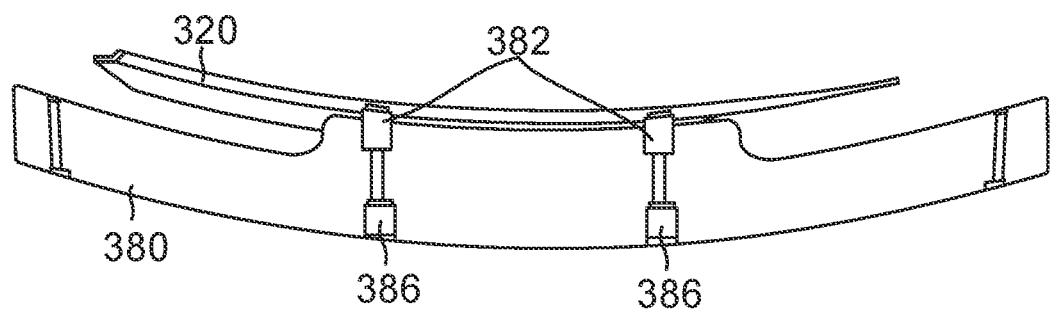
FIG. 3B is a side view cross-sectional diagram illustrating the example seal bar of FIG. 3A coupled to a workpiece.

FIGS. 3A and 3B illustrate an example seal bar 300 for use in seal assembly such as seal assembly 260 of FIG. 2A. FIG. 3A illustrates example seal bar 300 from a perspective view. FIG. 3B is a side cross-sectional diagram illustrating example seal bar 300 and example workpiece 320. In some examples, at least one seal bar 300 may be coupled to at least one of the first flow block 262 or second flow block 264 of FIGS. 2A-2C.

Seal bar 300 may provide an efficient and reliable method of sealing apertures or depressions within a workpiece 320. Seal bar 300 includes seal bar main body 380 and comprising at least one adjustable seal pad 382 configured to adjustably extend (e.g., protrude from seal bar main body 380 into the interelectrode gap) as illustrated by the arrows in FIG. 3A from a recess within the seal bar main body 380.

When a workpiece 320 defining one or more apertures or depressions 384 is in position for pECM processing, seal pads 382 may extend from recesses within seal bar main body 380 into apertures 384, forming an effective seal and preventing electrolyte from penetrating apertures 384 from exposure to electrolyte. Thus, apertures may be protected from pECM processing, maintaining the shape and dimensions of the apertures 384 during pECM processing. Subsequent to pECM processing, seal pads 382 may be returned to their corresponding recesses within seal bar main body 380 for reuse.

In some examples, seal bar 300 may include a seal pad 382 corresponding to each aperture or depression 384 defined by workpiece 320. In some examples, a seal assembly (e.g, seal assembly 200, FIG. 2A) may include more than one seal bar 300.

In some examples, seal pads 382 may adjustably extend from seal bar main body 380 by turning adjustment screws 386, which may be accessible when seal bar 300 is coupled to one or more opposing flow blocks (e.g., first flow block 262 or second flow block 264, FIG. 2A). In some examples, seal pads 382 include an insulator. In some examples, seal pads 382 comprise a compressible solid such as a rubber, elastomer, or the like.

Figure 4:
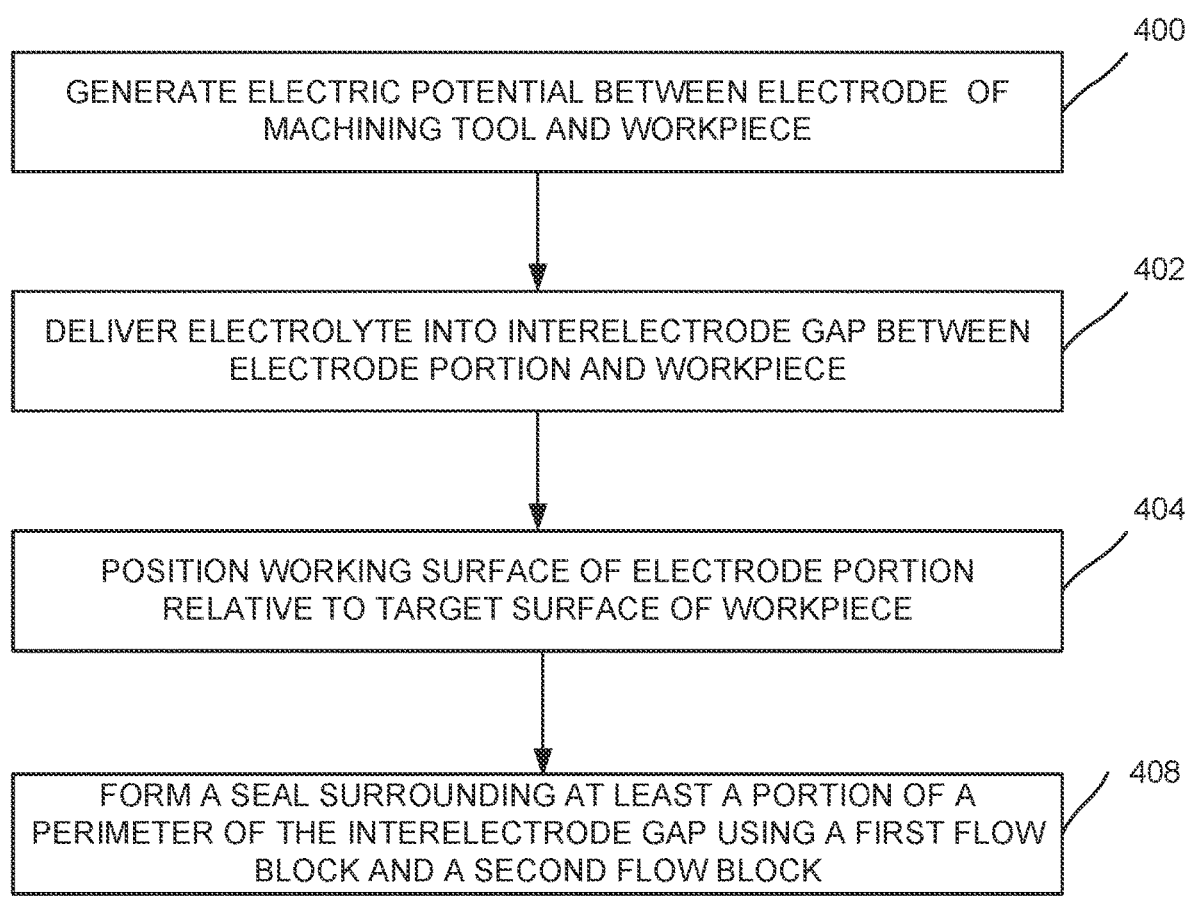
FIG. 4 is a flow diagram illustrating an example technique for pECM using the example seal assembly of FIG. 2A.

FIG. 4 is a flow diagram illustrating an example technique for pulsed electrochemical machining a workpiece. The illustrated technique may be carried out using pECM system 100 of FIG. 1A. The technique will be described with reference to pECM system 100 of FIGS. 1A-1D, sealing assembly 260 of FIGS. 2A-2C, and seal bar 300 of FIGS. 3A-3B, but one of skill in the art will recognize that different systems may be used to perform the technique of FIG. 4, and the systems and devices of FIGS. 1A-3B may be used to perform different techniques.

While illustrated sequentially, the various steps of FIG. 4 may be initiated in a different order (or sequentially) to remove material from workpiece 120. Control system 108 may cause actuation system 110 to position working surface 124 of electrode 122 relative to target surface 126 of workpiece 120 (400) to control the size of interelectrode gap 130 and advance working surface 124 toward target surface 126 as material is removed from workpiece 120. In some examples, interelectrode gap 130 may be on the order of about 10 microns although other values are contemplated. The illustrated technique includes forming a seal surrounding at least a portion of a perimeter of interelectrode gap 130 using first flow block 162 and second flow block 164 (402) configured to reduce or eliminate flow of the electrolyte out of the portion of the perimeter of the interelectrode gap 130. Control system 108 may cause electrolyte system 104 to deliver electrolyte 132 into interelectrode gap 130 between working surface 124 of electrode 122 and target surface 126 of workpiece 120 (404) to form an electrolytic cell. Control system may cause power supply 106 to generate an electric potential between electrode 122 and workpiece 120 (406).

In some examples, forming a seal surrounding at least a portion of a perimeter of the interelectrode gap includes mechanically coupling first flow block 162 to tool body 116 and second flow block 164 to workpiece 120, In some examples, the technique includes mechanically coupling first flow block 162 and second flow block 164 together to form the seal surrounding at least a portion of the perimeter of interelectrode gap 130.

In some examples, as illustrated in FIG. 2A, the technique of FIG. 4 includes forming a seal around tool body 216 by surrounding at least a portion of the perimeter of tool body with cathode seal body 266. In some examples, forming a seal around tool body 216 by surrounding at least a portion of the perimeter of the tool body 216 with cathode seal body 266 includes sliding the cathode seal body over the proximal end 272 or working surface 224 at the distal end of the tool body 216. In some examples, a seal may be formed around the perimeter of tool body 216 by positioning cathode seal body 266 within cathode seal collar 268 defined by first flow block 262. In some examples, a o-ring may be positioned in groove 274 defined along at least a portion of the perimeter of cathode seal body 266, the o-ring configured to form an effective seal (e.g., fluid-tight or nearly fluid tight) between cathode seal body 266 and first flow block 262.

In some examples, the technique of FIG. 4 includes positioning one or more gaskets 270 between first flow block 262 and second flow block 264. In some examples, the technique may include mechanically coupling first flow block 262 and second flow block 264 by tightening at least one bolt or screw (not illustrated) which applies pressure to gasket(s) 270 positioned between first flow block 262 and second flow block 264.

The technique of FIG. 4 may also include coupling at least one seal bar (300, FIGS. 3A-3B) to at least one of the first flow block 262 or second flow block 264. In some examples, seal bar 300 includes at least one adjustable seal pad 382 configured to adjustably extend from a recess within seal bar 300. The technique may include adjustably extending seal pad 382 from seal bar 300 into one or more apertures 384 in workpiece 320 by turning adjustment screws 386 to prevent electrolyte from penetrating apertures 384 in workpiece 320. The technique may also include turning adjustment screws 386 to return seal pads 382 to their corresponding recesses within seal bar main body 380 to remove workpiece 320 from the pECM system after pECM operations.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following numbered examples and claims.

Example 1: A pulsed electrochemical machining (pECM) system includes a tool body defining a tool axis and a proximal end and a distal end, the tool body comprising one or more electrodes, each of the one or more electrodes comprising an electrically conductive material and defining a working surface at the distal end of the tool axis configured to face a workpiece; an interelectrode gap defined by the working surface at the distal end of the tool axis and a target surface at a proximal end of the workpiece; an electrolyte configured to be charged by the one or more electrodes and at least partially fill the interelectrode gap; a first flow block coupled to the tool body; and a second flow block coupled to the workpiece, wherein the first flow block and second flow block are configured to form at least one seal surrounding at least a portion of a perimeter of the interelectrode gap, wherein the at least one seal is configured to reduce or eliminate flow of the electrolyte out of the portion of the perimeter of the interelectrode gap.

Example 2: The pulsed electrochemical machining system of example 1, further comprising a cathode seal body surrounding a perimeter of the tool body, the cathode seal body being configured to form a seal around the perimeter of the tool body such that the electrolyte is prevented from flowing along sides of the tool body adjacent to the first flow block.

Example 3: The pulsed electrochemical machining system of example 2, wherein the cathode seal body is formed in one piece by additive manufacturing.

Example 4: The pulsed electrochemical machining system of any of examples 1-3, further comprising at least one gasket disposed between the first flow block and second flow block.

Example 5: The pulsed electrochemical machining system of example 4, wherein the first and second flow blocks are mechanically coupled together by at least one fastener such that pressure is applied to the at least one gasket disposed between the flow blocks.

Example 6: The pulsed electrochemical machining system of example 2, wherein the cathode seal body is configured to be disposed in a cathode seal collar defined by the first flow block.

Example 7: The pulsed electrochemical machining system of example 6, further comprising a groove defined along at least a portion of the perimeter of the cathode seal body and configured to receive an o-ring, wherein the o-ring forms the seal between the cathode seal body and the first flow block.

Example 8: The pulsed electrochemical machining system of any of examples 2, 3, 6 or 7, wherein the tool body defines an outer perimeter defining a shape, and the cathode seal body defines an outer perimeter defining a different shape.

Example 9: The pulsed electrochemical machining system of any of examples 1-8, further comprising at least one seal bar coupled to at least one of the first or second flow blocks, the seal bar comprising at least one adjustable seal pad configured to adjustably extend from a recess within the seal bar.

Example 10: The pulsed electrochemical machining system of any of examples 1-9, wherein the workpiece is configured to form a part of the at least one seal formed by the first flow block and the second flow block.

Example 11: The pulsed electrochemical machining system of any of examples 1-10, wherein the at least one seal surrounds the entire perimeter of the interelectrode gap except for an electrolyte inlet and an electrolyte outlet.

Example 12: A method for pulsed electrochemical machining (pECM) a workpiece includes positioning a working surface of one or more electrodes relative to a target surface of a workpiece to remove material from the target surface of the workpiece; forming a seal surrounding at least a portion of a perimeter of an interelectrode gap, the at least one seal configured to reduce or eliminate flow of an electrolyte out of the portion of the perimeter of the interelectrode gap, the at least one seal formed by a first flow block coupled to a tool body and a second flow block coupled to the workpiece; delivering the electrolyte into the interelectrode gap between the working surface of the one or more electrodes and a target surface of the workpiece; and generating a pulsed direct current between one or more electrodes of a machining tool and the workpiece, wherein the machining tool comprises the tool body defining a tool axis, the tool body comprising the one or more electrodes, each of the one or more electrodes comprising an electrically conductive material and defining the working surface at a distal end of the tool axis configured to face the workpiece.

Example 13: The method of example 12, further comprising mechanically coupling the first flow block and the second flow block together to form the seal surrounding at least a portion of the perimeter of the interelectrode gap.

Example 14: The method of example 12 or 13, further includes forming a seal around the tool body by surrounding at least a portion of the perimeter of the tool body with a cathode seal body such that the electrolyte is prevented from flowing along sides of the tool body adjacent to the first flow block.

Example 15: The method of example 13, wherein forming a seal around the tool body by surrounding at least a portion of the perimeter of the tool body with a cathode seal body includes sliding the cathode seal body over a proximal or distal end of the tool body.

Example 16: The method of any of examples 12-15, further includes positioning a gasket between the first flow block and the second flow block.

Example 17: The method of example 16, further includes mechanically coupling the first flow block and the second flow block by tightening at least one fastener which applies pressure to the gasket positioned between the first flow block and the second flow block.

Example 18: The method of example 14, wherein forming a seal around the tool body by surrounding at least a portion of the perimeter of the tool body with a cathode seal body comprises positioning the cathode seal body within a cathode seal collar defined by the first flow block.

Example 19: The method of example 18, further includes positioning an o-ring in a groove defined along at least a portion of the perimeter of the cathode seal body to form the seal between the cathode seal body and the first flow block.

Example 20: The method of any of examples 12-19, further includes coupling at least one seal bar to at least one of the first flow block or the second flow block, the seal bar comprising at least one adjustable seal pad configured to adjustably extend from a recess within the seal bar.

Example 21: The method of any of example 20, further includes sealing at least one aperture or depression in the workpiece by adjustably extending an adjustable seal pad from a recess within the seal bar to into the aperture or depression in the workpiece.

Example 22: A pulsed electrochemical machining (pECM) system includes an pECM tool comprising a tool body defining a tool axis, the tool body comprising one or more electrodes, each of the one or more electrodes comprising an electrically conductive material and defining a working surface at a distal end of the tool axis configured to face a workpiece; a mechanical system configured to position the working surface of the one or more electrodes relative to the workpiece; an electrolyte system configured to supply electrolyte to an interelectrode gap between the working surface of the one or more electrodes and a target surface of the workpiece; and a power supply configured to generate a pulsed direct current between the one or more electrodes of the pECM tool and the workpiece an electrolyte configured to be charged by the one or more electrodes and at least partially fill the interelectrode gap; a first flow block coupled to the tool body; and a second flow block coupled to the workpiece, wherein the first flow block and second flow block are configured to form at least one seal surrounding at least a portion of a perimeter of the interelectrode gap, wherein the at least one seal is configured to reduce or eliminate flow of the electrolyte out of the portion of the perimeter of the interelectrode gap.

The invention claimed is:

1. A pulsed electrochemical machining (pECM) system, comprising:
   a tool body defining a tool axis and a proximal end and a distal end, the tool body comprising one or more electrodes, each of the one or more electrodes comprising an electrically conductive material and defining a working surface at the distal end of the tool axis configured to face a workpiece;
   an interelectrode gap defined by the working surface at the distal end of the tool axis and a target surface at a proximal end of the workpiece;
   an electrolyte configured to be charged by the one or more electrodes and at least partially fill the interelectrode gap;
   a first flow block coupled to the tool body;
   a cathode seal body surrounding a perimeter of the tool body, the cathode seal body being configured to form a seal around the perimeter of the tool body such that the electrolyte is prevented from flowing along sides of the tool body adjacent to the first flow block, wherein the cathode seal body is configured to be disposed in a cathode seal collar defined by the first flow block, and wherein the cathode seal body comprises a groove defined along at least a portion of the perimeter of the cathode seal body and configured to receive a cathode seal body gasket, wherein the cathode seal body gasket forms the seal between the cathode seal body and the first flow block; and a second flow block coupled to the workpiece, wherein the first flow block and second flow block are configured to form at least one seal surrounding at least a portion of a perimeter of the interelectrode gap, wherein the at least one seal is configured to reduce or eliminate flow of the electrolyte out of the portion of the perimeter of the interelectrode gap.

2. The pulsed electrochemical machining system of claim 1, wherein the cathode seal body is formed in one piece by additive manufacturing.

3. The pulsed electrochemical machining system claim 1, further comprising at least one gasket disposed between the first flow block and second flow block.

4. The pulsed electrochemical machining system of claim 3, wherein the first and second flow blocks are mechanically coupled together by at least one fastener such that pressure is applied to the at least one gasket disposed between the flow blocks.

5. The pulsed electrochemical machining system of claim 1, wherein the cathode seal body gasket comprises an o-ring, and wherein the o-ring forms the seal between the cathode seal body and the first flow block.

6. The pulsed electrochemical machining system of claim 1, wherein the tool body defines an outer perimeter defining a shape, and the cathode seal body defines an outer perimeter defining a different shape.

7. The pulsed electrochemical machining system of claim 1, further comprising at least one seal bar coupled to at least one of the first or second flow blocks, the seal bar comprising at least one adjustable seal pad configured to adjustably extend from a recess within the seal bar.

8. The pulsed electrochemical machining system of claim 1, wherein the workpiece is configured to form a part of the at least one seal formed by the first flow block and the second flow block.

9. The pulsed electrochemical machining system claim 1, wherein the at least one seal surrounds the entire perimeter of the interelectrode gap except for an electrolyte inlet and an electrolyte outlet.

10. A method for pulsed electrochemical machining (pECM) a workpiece, comprising:
positioning a working surface of one or more electrodes relative to a target surface of a workpiece to remove material from the target surface of the workpiece;
forming a seal surrounding at least a portion of a perimeter of an interelectrode gap, the at least one seal configured to reduce or eliminate flow of an electrolyte out of the portion of the perimeter of the interelectrode gap, the at least one seal formed by a first flow block coupled to a tool body and a second flow block coupled to the workpiece, wherein forming the seal comprises:
positioning a cathode seal body surrounding a perimeter of the tool body, the cathode seal body preventing electrolyte from flowing along sides of the tool body adjacent to the first flow block, and wherein positioning the cathode seal body includes
disposing the cathode seal body in a cathode seal collar defined by the first flow block, wherein the cathode seal body comprises a groove defined along at least a portion of the perimeter of the cathode seal body, the groove mechanically supporting a cathode seal body gasket, wherein the cathode seal body gasket forms a seal between the cathode seal body and the first flow block;
delivering the electrolyte into the interelectrode gap between the working surface of the one or more electrodes and a target surface of the workpiece; and
generating a pulsed direct current between one or more electrodes of a machining tool and the workpiece, wherein the machining tool comprises the tool body defining a tool axis, the tool body comprising the one or more electrodes, each of the one or more electrodes comprising an electrically conductive material and defining the working surface at a distal end of the tool axis configured to face the workpiece.

11. The method of claim 10, further comprising mechanically coupling the first flow block and the second flow block together to form the seal surrounding at least a portion of the perimeter of the interelectrode gap.

12. The method of claim 11, wherein forming a seal around the tool body by surrounding at least a portion of the perimeter of the tool body with a cathode seal body includes sliding the cathode seal body over a proximal or distal end of the tool body.

13. The method of claim 10, further comprising:
positioning a gasket between the first flow block and the second flow block.

14. The method of claim 13, further comprising:
mechanically coupling the first flow block and the second flow block by tightening at least one fastener which applies pressure to the gasket positioned between the first flow block and the second flow block.

15. The method of claim 10, further comprising:
positioning an o-ring in the groove defined along at least a portion of the perimeter of the cathode seal body to form the seal between the cathode seal body and the first flow block.

16. The method of claim 10, further comprising:
coupling at least one seal bar to at least one of the first flow block or the second flow block, the seal bar comprising at least one adjustable seal pad configured to adjustably extend from a recess within the seal bar.

* * * * *